3,168,524
CATALYTIC DEHYDROGENATION OF ALKYL PYRIDINES
John E. Mahan, Stanley D. Turk, and Ralph P. Williams, Bartlesville, Okla., assignors to Phillips Petroleum Company, a corporation of Delaware
No Drawing. Filed Dec. 14, 1959, Ser. No. 859,150
5 Claims. (Cl. 260—290)

This invention relates to catalysts. In another aspect, it relates to a dehydrogenation process utilizing such catalysts.

This is a continuation-in-part application of our copending application Serial No. 734,424, filed May 25, 1958, now abandoned.

In the catalytic dehydrogenation of alkylpyridines to produce alkenylpyridines the first catalytic materials developed required periodic regeneration steps to remove the coke or carbonaceous material deposited on the catalyst during the dehydrogenation reaction. Later, catalysts were developed which were partially self-regenerating when the reactant materials were admixed with steam so that the operation could be carried out in a continuous manner with only occasional regeneration, say as little as one hour for each twenty-four hours of operation.

A typical catalyst of this type is an iron oxide catalyst containing a small amount of chromium oxide as a stabilizer and a small amount of potassium compound as a promoter. While yields, i.e., mols of product produced per 100 mols of feed charged on a once-through basis, are excellent with this type of catalyst, the selectivity, i.e., mols of product produced per 100 mols of feed destroyed, while satisfactory for many purposes leaves considerable room for improvement. It will be understood that, in a commercial plant employing large quantities of material, an increase in the order of one percentage point in selectivity provides a very substantial net increase in production because this increase, instead of being converted to unwanted and unsalable by-products, is converted to the desired product. A very important advance in this direction was made by the still later development and commercial use of a catalyst containing over 50 weight percent potassium carbonate, a small amount of chromium oxide and a large amount of iron oxide.

We have now discovered a new chromium oxide-potassium compound-iron oxide catalyst which gives even greater selectivity in the dehydrogenation of alkylpyridines, such as 2-methyl-5-ethylpyridine, to produce alkenylpyridines than any previously known catalyst. Also, when operating with the catalyst of the invention to dehydrogenate an alkylpyridine, it has been found that this higher selectivity can be obtained with relatively high per pass conversions of the starting material; moreover, although the selectivity decreases as the per pass conversion increases, this effect is less pronounced than with prior catalysts.

Broadly, the catalyst of the invention comprises a mixture of chromium oxide, iron oxide and a potassium compound, of which mixture 20 to 68 weight percent is chromium oxide, 1 to 30 weight percent is iron oxide and 5 to 79 weight percent is the potassium compound, calculated as $K_2CO_3$. The potassium compound employed is one or more of potassium hydroxide, potassium oxide or potassium carbonate, although catalyst preparation is usually easier when making up the catalyst mixture employing potassium carbonate, and potassium carbonate is usually employed. Although superior catalysts are obtained in the broad range of compositions given above, it is generally preferred that the mixture contain 30 to 68 weight percent of chromium oxide, 2 to 10 weight percent of iron oxide and 30 to 68 weight percent of the potassium compound. Such catalysts are self-regenerative when employed in accordance with the invention, using steam in admixture with the feed, and in practice can be employed without burning off carbonaceous material with oxygen-containing gases during the entire life of the catalyst. The now most usually employed catalyst composition is one in which the mixture contains from 40 to 45 weight percent chromium oxide, 50 to 55 weight percent potassium compound, and 3 to 7 weight percent iron oxide. Such catalysts not only have high selectivities at high per pass conversions and are self-regenerative but also have a long life at high activity and selectivity.

In preparing the catalyst of this invention it is advantageous to utilize an iron oxide wherein substantially all the particles have a size of two microns or less, and an average particle size of less than one micron. Usually the chromium oxide employed is substantially all of a particle size of less than 8 microns.

Numerous methods for preparing the catalyst are available. For example, the catalyst components can be brought together in a mill, such as a hammer mill, and milled to break up the agglomerates to small size, the milled mixture pelleted and dried, and the catalyst used in the dehydrogenation process. Alternatively, the catalyst components can be formed into a paste with any suitable liquid such as water or dilute tannic acid, and extruded into any desired shape or size. Other methods involving coprecipitation, impregnation and other known methods, may also be used with satisfactory results. By whatever method the catalyst is prepared it is usually given a final heat treatment below the calcination temperature to afford a final drying for a period of from 6 to 20 hours at 1000° F. This heat treatment is preferably effected in the absence of an oxidizing atmosphere.

It will be obvious to those skilled in the art that rather than using iron oxide and chromium oxide as starting materials the metal nitrates may be used and thermally decomposed in the process of preparation of the catalyst.

In the dehydrogenation process utilizing the catalyst of the invention in the production of alkenylpyridines from alkylpyridines containing at least one alkyl group having at least 2 carbon atoms, the reaction is effected at high temperature and in the presence of steam. The temperature is ordinarily in the range from 1100 to 1300° F. With temperatures much below 1100° F. the conversion falls off rapidly and with temperatures much above 1300° F. the selectivity of the reaction decreases undesirably; however, the catalyst can be employed both at higher and lower temperatures than those indicated, such as for instance, at temperatures within the range from 1000 to 1400° F.

The steam diluent is ordinarily employed in the amount of 2 to 15 parts by weight per part of alkylpyridine charged, usually between 4 and 10 parts by weight per part of alkylpyridine. It is advantageous to maintain a pressure as low as feasible and pressures within the range from 14.7 to 25 p.s.i.a. are ordinarily utilized. However, elevated pressures are operable. During the conversion, the flow rate of the alkylpyridine feed vapors, expressed as liquid hourly spaced velocity, that is, liquid volumes of alkylpyridine charged per volume of catalyst per hour, is generally in the range between 0.5 and 5.

The process of this invention is applicable to the dehydrogenation of alkylpyridines where at least one alkyl group is present which contains at least two adjacent carbon atoms, each having an attached hydrogen atom. Di-, tri-, and tetraalkylpyridines can be dehydrogenated with the alkyl substituents being present in various positions on the pyridine nucleus, for instance, 2,4-diisopropyl-6-ethylpyridine and 2,3,4,6-tetraethylpyridine. It is understood that the alkenylpyridine produced can contain one or more alkenyl or vinyl groups and also one or more alkyl groups, particularly the methyl group. The invention is most advantageously applicable to alkylpyridines of the foregoing description having one to four alkyl groups and having from 2 to 8 total carbon atoms in the alkyl groups, no one alkyl group containing more than 5 carbon atoms. Besides the commercially important 2-methyl-5-methylpyridine, other examples of the technically important group of alkylpyridines having only one or two alkyl groups which can be dehydrogenated according to the present process are 2-ethyl-4-ethylpyridine, 3-isopropylpyridine, 2-ethylpyridine, 2--ethyl-5-ethylpyridine, 2-methyl-4-isobutylpyridine, 3-ethylpyridine, 3-n-propylpyridine, 2-isopropyl-4-(3-methylbutyl) pyridine, 2-n-butylpyridine, 2-n-amylpyridine, and 3-n-amylpyridine.

The examples which follow are illustrative of the invention only, and are not to be construed to limit the scope of the invention.

In Examples I through III, which follow, the catalyst of the invention designated as A was prepared in the following manner:

The following ingredients were dry blended in the preparation of the catalyst:

|   | Grams |
|---|---|
| $K_2CO_3$ [1] | 208.8 |
| $Cr_2O_3$ [2] | 171.2 |
| $Fe_2O_3$ [3] | 20.0 |

[1] Baker and Adamson, Reagent Grade, anhydrous, lot M-234.
[2] J. T. Baker's C.P., lot 7582. 97 percent 5 microns or less in diameter.
[3] C. K. Williams, RO-3097, Kroma Red Series. At least 99.0 percent of the particles 1 micron or less in diameter.

The potassium carbonate was hammer milled (1/16 inch screen on hammer mill) prior to dry blending it with the other ingredients. A small amount of graphite was included in the composition as a lubricant. The ingredients were dry blended and 3/16 inch diameter tablets, or slugs, were prepared on a Stokes BB-2 pilling machine at 65 pounds pressure. The slugs were ground in a Foley food mill after which the particles were rubbed through a 20 mesh screen and the resulting powder was then sieved to a 35 to 100 mesh size. Water (10 weight percent of the 35–100 mesh powder) and a small additional amount of graphite were blended with the powdered material and the blend was sieved to a 35–100 mesh size. Pellets 1/8 inch in diameter and 1/8 inch long were prepared from the catalyst mixture using a Stokes BB-2 pilling machine. A crushing strength test was made. The average crushing strength of 40 pills was 6.9 pounds (total force).

The catalyst was thereafter heated in an oven at 110° C. for 72 hours. It was then put in place in a vertical reactor comprising a pipe approximately 5 feet long and having an inside diameter of 1 inch. Electrical resistance heaters were placed at intervals throughout the length of the reactor. The catalyst was supported on Berl saddles which were previously crushed and screened to 3.5–5 mesh. About 4 inches of the crushed Berl saddles were charged, then 50 cc. of the catalyst, and then more Berl saddles to fill the remaining portion of the reactor to within about 1 inch of the top.

The catalyst was thereafter given a final drying treatment by heating it slowly in place in the reactor to 1000° F. at a rate less than 150° F. per hour. Nitrogen was passed over the catalyst during the heating period at a rate of about 90 cc. per minute. The time of this heating was 7 hours and 10 minutes. The temperature was then maintained at 900–1000° F. for 15 hours during which time the passage of nitrogen gas over the catalyst was continued.

In Examples I through III two prior art catalysts designated as B and C were similarly placed in reactors for the purpose of making the comparative runs set forth in these examples. The three catalysts are set forth in Table I below which shows the parts by weight of each of the active ingredients of the respective catalysts.

TABLE I

| Catalyst | Weight Percent | | |
|---|---|---|---|
|  | $Cr_2O_3$ | $K_2CO_3$ | $Fe_2O_3$ |
| A | 42.8 | 52.2 | 5 |
| B | 3.2 | 52.2 | 44.6 |
| C | 3.0 | 12.0 | 85.0 |

To obtain the results shown in Examples I through III, each of the reactors containing catalysts A, B and C, respectively, were run continuously during the day time for a period of from about 4 to 6 hours each day under reaction conditions while charging the 2-methyl-5-ethylpyridine with steam as feed to the reactors. Once or twice a day quantitative runs would be made, usually of 1 hour each. That is, the reaction products were carefully collected and analyzed during these periods to obtain the data, while the rest of the time during the day the product was discarded. Near the end of the day the flow of 2-methyl-5-ethylpyridine was discontinued and that which remained in the reactor was flushed out by passing steam through the reactor for 30 minutes at the reaction temperature. The steam was shut off and the catalyst was allowed to cool to about 100° F. while nitrogen was being passed over it. The flow of nitrogen was continued overnight with the temperature being maintained at about 1000° F. In preparation for another day's operation, the temperature was increased to at least 1100° F. at which time the flow of nitrogen was discontinued and steam was passed through the reactor for 15 to 30 minutes before 2-methyl - 5 - ethylpyridine was introduced together with steam. The temperature was adjusted at the operating level and operation was continued for the remainder of the day. Occasionally, a quantitative test was made of 6 hours duration, and the results from these runs are shown in Example III.

The periods of steaming the catalyst without introducing feed material to be dehydrogenated are unnecessary in commercial operations, but were employed in these tests in order to flush out the nitrogen and raise the reaction temperature before the introduction of feed.

Reaction conditions were varied from day to day for the collection of samples under different conditions. The results shown in Examples I through III show the time at which each quantitative run was made, as indicated by the catalyst age in hours. In the tables the term catalyst age means the total time that the charge stock has been passed over the catalyst before the beginning of the quantitative run, and does not take into account the steaming periods or the periods of flushing with nitrogen.

The method of conducting the tests in Examples I through III was as follows: liquid 2-methyl-5-ethylpyridine, contained in a graduated reservoir, and water, also contained in a graduated reservoir, were pumped continuously and simultaneously through two micro-bellows pumps. The 2-methyl-5-ethylpyridine was passed directly to the top of the reactor where it was vaporized. The water was pumped through a preheater where it was heated to 600–700° F. and then passed to the top of the reactor where it was mixed with vaporized 2-methyl-5-ethylpyridine. The 2 - methyl - 5 - ethylpyridine space velocity used in these examples was 1.8 volumes/volume catalyst/hour which corresponded to a pumping rate of about 90 cc./hour. The steam to 2-methyl-5-ethylpyridine weight ratio was maintained at about 6:1 which corresponded to 490-500 cc. water pumped per hour.

Gases were passed from the bottom of the reactor to a water-cooled condenser where normally liquid products were condensed and then collected in a receiver. Off gas was passed through another water-cooled condenser and then through a Dry Ice trap and finally through a wet test meter. Most of the liquid materials contained in the off gas were collected in the Dry Ice trap and were then added to the liquid products previously collected.

The liquid portion of the reactor effluent obtained in the quantitative run contained both aqueous and oil phases which were separated. In the runs of Examples I and II, the aqueous phase was saturated with potassium carbonate to salt out any dissolved alkylpyridines. The oil phase which was separated was added to the original oil phase. The combined oil phase was then saturated with potassium carbonate and the water contained in it was separated and the oil recovered was weighed. It was submitted for a mass spectrometer analysis and found to contain 3-ethylpyridine, 2-picoline, 3-picoline, 3-vinylpyridine, 2,5-lutidine, 2-methyl-5-vinylpyridine, and unreacted 2-methyl-5-ethylpyridine. In the 6 hour runs of Example III, the liquid portion of the reactor effluent contained a larger volume of water than the runs of Examples I and II. After separation of the aqueous and oil phases, the aqueous phase was distilled, about 500 cc. being taken overhead. The residue was discarded. The distillate was combined with the original oil phase and the two phases were separated. The aqueous phase was treated with potassium carbonate and the remainder of the procedure was the same as for the run of Examples I and II. This method requires less potassium carbonate than would be needed if the entire aqueous phase were treated.

The mass spectrometer takes no account of water present. A 25 gram sample of the oil phase was analyzed for water by adding 100 cc. of toluene, azeotroping out the water, collecting it in a trap, and measuring it. From the weight of original oil analyzed and the amount of water found, the quantity of dry oil was calculated. The spectrometer analysis was applied to the dry oil for calculation of the amount of each material present.

*Example I*

Results of two runs each using catalyst, A, B, and C are shown below in Table II.

TABLE II

| Run No. | Catalyst | Catalyst Age, Hours | Temperature, °F. | MVP Yield, Mol Percent | | MEP Conversion, Percent |
|---|---|---|---|---|---|---|
| | | | | Per Pass | Selectivity | |
| 1 | A | 37 | 1,168-1,170 | 38.9 | 88.7 | 43.9 |
| 2 | A | 38 | 1,168-1,170 | 38.3 | 89.0 | 43.0 |
| 3 | B | 35 | 1,110-1,115 | 33.3 | 82.0 | 40.6 |
| 4 | B | 54 | 1,110-1,115 | 34.5 | 83.0 | 41.7 |
| 5 | C | 36 | 1,110-1,114 | 33.1 | 71.0 | 46.7 |
| 6 | C | 37 | 1,108-1,111 | 32.3 | 72.0 | 44.9 |

The 2-methyl-5-vinylpyridine (MVP) per pass yield, MVP selectivity, and 2-methyl-5-ethylpyridine (MEP) conversion were calculated in the following manner:

$$\frac{\text{Mols MVP obtained}}{\text{Mols MEP charged}} (100\%) = \text{MVP per pass yield}$$

$$\frac{\text{Mols MVP obtained}}{\text{Mols MEP consumed}} (100\%) = \text{MVP selectivity (ultimate yield)}$$

$$\frac{\text{MVP per pass yield}}{\text{MVP selectivity}} (100\%) = \text{MEP conversion}$$

It can be seen from the foregoing data that the MVP selectivities from the runs using the catalyst of the invention are much higher than those from the runs using catalyst B and C, and that the higher selectivities are obtained even though the MEP conversion is higher with catalyst A than with catalyst B. Although the conversion employed in the runs with catalyst C was higher than the conversion was carried with catalyst A, it will be seen that the conversion of run 6 was only 1 percent higher than run 1 while the selectivity was 16.7 points lower. The following Example II, moreover, makes it clear that the slightly lower conversion with catalyst A shown in Table II does not account for its greatly increased selectivity over catalyst C, shown in Table II.

*Example II*

One-hour runs were made with each of catalyst A, B, and C. Results are set forth in Table III.

TABLE III

| Run No. | Catalyst | Catalyst Age, Hours | Temperature, °F. | MVP Yield, Mol Percent | | MEP Conversion, Percent |
|---|---|---|---|---|---|---|
| | | | | Per Pass | Selectivity | |
| 1 | A | 90 | 1,198-1,203 | 49.0 | 86.4 | 56.6 |
| 2 | B | 108 | 1,146-1,160 | 43.6 | 76.0 | 57.4 |
| 3 | C | 94 | 1,097-1,105 | 34.4 | 68.2 | 50.5 |

These data show that with the increase in temperature a higher per pass yield is obtained together with a higher conversion, and yet the selectivity remains very high with catalyst A of the invention. In comparison prior art catalyst B and C at about the same MEP conversion, or lower, have much lower selectivities. This example, and the other examples herein show the relative insensitiveness of the MVP selectivity over a wide range of MEP conversions, a decided advantage in commercial operation.

*Example III*

Two six-hour runs were made using catalyst composition A and one six-hour run was made using catalyst composition B and one six-hour run using catalyst C. Results of these runs are set forth in Table IV.

TABLE IV

| Run No. | Catalyst | Catalyst Age, Hours | Temperature, °F. | MVP Yield, Mol Percent | | MEP Conversion, Percent |
|---|---|---|---|---|---|---|
| | | | | Per Pass | Selectivity | |
| 1 | A | 94 | 1,163-1,170 | 38.8 | 89.5 | 43.3 |
| 2 | A | 119 | 1,277-1,284 | 64.4 | 80.0 | 80.5 |
| 3 | B | 113 | 1,105-1,120 | 32.6 | 83.0 | 39.3 |
| 4 | C | 98 | 1,096-1,105 | 33.4 | 72.0 | 46.3 |

These runs illustrate in a longer run the relatively very high selectivity of the catalyst composition A of the invention compared to the prior art. Run 2 is particularly noteworthy in that even at the very high MEP conversion of 80.5 percent, the MVP selectivity was maintained at 80 percent.

*Example IV*

To show that the excellent results obtained in the shorter runs of Examples I through II can be maintained over a long period of time, a life test was carried out with catalyst A. For comparative purposes a life test was also effected with catalyst B. The runs were effected under the same conditions described as to feed rate, space velocity, steam ratio, etc., as described with respect to Examples I to III, but the run was continuously on conversion without interruption for a period of 46 days. During the period the temperature was varied to obtain various degrees of conversion of the MEP. For these life tests, the reactor was modified to use line steam so that the water reservoir, pump and preheater were eliminated. The effluent was analyzed at intervals, and the length of time during which the sample was taken for analysis is given in the right hand column of Table V which follows. Reaction temperature in the life test using catalyst A varied throughout the 46 days from 1,150 to 1294° F., with the temperatures prevailing during the sampling portions of the tests being given in Table V. Checks of the operation during the first nine days with catalyst A indicated that the MVP selectivity was improving with age. Complete data beginning on the tenth day and spaced over a period up to 46 days are shown on two hour runs through this period for catalyst A in Table V below, while similar data is shown beginning with the ninth day for catalyst B.

TABLE V

| Catalyst Age, days | Temp., °F. | MVP Yields, Mol Percent | | MEP, Conv. Percent | Duration or Run, Hours |
|---|---|---|---|---|---|
| | | Per Pass | Selectivity | | |
| Catalyst A: | | | | | |
| 10 | 1,195–1,200 | 40.8 | 87.5 | 46.6 | 2 |
| 11 | 1,188–1,198 | 39.2 | 90.3 | 43.4 | 2 |
| 15 | 1,189–1,191 | 37.0 | 95.1 | 38.9 | 2 |
| 17 | 1,186–1,195 | 37.5 | 90.0 | 41.7 | 2 |
| 22 | 1,190–1,195 | 36.3 | 92.7 | 39.2 | 2 |
| 24 | 1,184–1,190 | 34.6 | 95.6 | 36.2 | 1 |
| 33 | 1,182–1,196 | 34.7 | 92.9 | 37.3 | 2 |
| 36 | 1,275–1,294 | 60.1 | 82.1 | 73.2 | 2 |
| 39 | 1,280–1,291 | 57.3 | 80.8 | 70.9 | 2 |
| 42 | 1,283–1,290 | 55.4 | 81.2 | 68.4 | 2 |
| 46 | 1,283–1,294 | 53.2 | 80.0 | 66.5 | 2 |
| Catalyst B: | | | | | |
| 9 | 1,130–1,135 | 33.9 | 80.3 | 42.2 | 2 |
| 11 | 1,140–1,147 | 36.0 | 76.8 | 47.0 | 2 |
| 16 | 1,132–1,135 | 32.5 | 80.0 | 40.7 | 2 |
| 22 | 1,130–1,135 | 31.5 | 80.5 | 39.2 | 2 |
| 28 | 1,135–1,143 | 33.0 | 80.4 | 41.0 | 2 |
| 30 | 1,135–1,142 | 37.4 | 76.0 | 49.2 | 1 |
| 30 | 1,140–1,144 | 36.4 | 73.8 | 49.4 | 1 |
| 32 | 1,135–1,141 | 30.7 | 76.5 | 40.2 | 2 |
| 36 | 1,145–1,158 | 37.4 | 76.7 | 48.8 | 2 |
| 37 | 1,154–1,160 | 35.9 | 77.8 | 46.1 | 2 |

It will be seen that the life test with catalyst A is in general even superior to the tests of catalyst A shown in Examples I through III, in which the catalyst age under conversion conditions was shorter. The life test with catalyst A compares quite favorably with the test of catalyst B, as is apparent from the data.

In the last four runs in the life test of catalyst A, the temperature was raised higher than normally would be done at this age of the catalyst in order to see the effect of the high MEP conversions on selectivity. It will be noted that the selectivities were maintained quite high even at the high temperatures and high conversions which were maintained throughout the last eleven days of the test. The data indicate a possible trend during the last eleven days toward a gradual lessening of the activity of the catalyst during the period where the unusually high conversions were maintained. In normal operation the temperatures would not usually be raised this high while the catalyst was still so active since it would usually be preferred to take advantage of the higher selectivities at somewhat lower conversion. However, if it were desired in operation to obtain as high a production as possible in a given plant, the high conversions could be taken advantage of while still obtaining selectivities in a range comparable to the selectivity shown in the life test with catalyst B at much lower conversions.

*Example V*

Another batch of catalyst of the invention was prepared using the same ingredients as catalyst A except that the chromium oxide was pigment grade chromic oxide; 97% of the chromium oxide had a particle size of 4 or less in diameter. The pills were prepared in the same manner as described with respect to catalyst A except that no water was added and the pills had an average crushing strength of 40 pills of 7.6 pounds (total force).

This catalyst was supported on Berl saddles in the reactor described before and 50 cc. were charged to the reactor in the same manner. Prior to charging the catalyst, it was heated in an oven at 110° C. for 60 hours. While in place in the reactor, this catalyst was also heated slowly to 1000° F. at a rate less than 150° F. per hour. Nitrogen was passed over the catalyst during the heating period at a rate of approximately 90 cc. per minute. The time taken for heating to 1000° F. was 6 hours and 15 minutes. The temperature was then maintained at 900–1000° F. for 15 hours during which time the passage of nitrogen over the catalyst was continued. 2-methyl-5-ethylpyridine was dehydrogenated employing this catalyst using a space velocity of the MEP of 1.8 volumes/volume catalyst/hour and a steam to MEP weight ratio of 6 to 1, a pressure a little above atmospheric and a temperature of 1,152 to 1155° F. After 3 days of continuous operation the product was collected over a period of two hours and analyzed. It was found that an MEP conversion of 39.7 had been obtained with a per pass yield of MVP of 35.8 and an MVP selectivity of 90.3.

*Example VI*

In this example, comparative dehydrogenation runs were carried out using the three catalyst compositions set forth in Table VI.

TABLE VI

| Catalyst | $Cr_2O_3$ | $K_2CO_3$ | $Fe_2O_3$ |
|---|---|---|---|
| D | 42.8 | 57.2 | 0 |
| E | 45.0 | 53.0 | 2.0 |
| F | 42.8 | 52.2 | 5.2 |

The $K_2CO_3$, $Cr_2O_3$ and $Fe_2O_3$ were dry blended by shaking together in a bottle followed by hammer milling through a 1/16-inch screen in a Raymond Hammer mill. One percent of graphite was blended with the milled mixture by shaking together in a bottle and the catalyst powder was formed into slugs (¼-inch tablets) on a Stokes, BB–2 pilling machine. The slugs were ground in a Foley food mill and the powder rubber through 20 and 35 mesh screens and retained on a 100 mesh screen. After drying the 35–100 mesh catalyst powder was heated in an air oven at 470 to 485° F. for 6 to 7 hours, 0.5 percent of graphite was added and the mixture was formed into ⅛-inch catalyst tablets on the BB–2 machine.

These catalysts were employed in the dehydrogenation of 2-methyl-5-ethylpyridine (MEP), the catalysts being in fixed beds in the tubular reactor employed. The reactors were operated continuously at an MEP space velocity of 1.8 volumes/volume/hour using a weight ratio of steam to MEP of about 6:1. Table VII below shows the age of the catalyst when the quantitative data was taken. Each period of data taking in runs 1–4, 8–11 was over a two hour period of operation, and each period of data taking in runs 5–7 was over a four hour period of operation. The results are shown in Table VII.

TABLE VII

| Run No. | Catalyst | Catalyst Age, Days | Catalyst [a] Temp., °F. | | MVP Yield, Mol Percent | | MEP Conversion, Percent |
|---|---|---|---|---|---|---|---|
| | | | Top | Bottom | Per Pass | Selectivity | |
| 1 | D | 5 | 1,173 | 1,172 | 28.9 | 89.6 | 32.3 |
| 2 | D | 13 | 1,171 | 1,169 | 28.8 | 88.3 | 32.6 |
| 3 | D | 15 | 1,170 | 1,171 | 28.8 | 86.0 | 33.5 |
| 4 | D | 20 | 1,171 | 1,171 | 29.6 | 84.1 | 35.2 |
| 5 | E | 6 | 1,160 | 1,159 | 35.4 | 89.4 | 39.6 |
| 6 | E | 10 | 1,162 | 1,161 | 35.9 | 90.5 | 39.7 |
| 7 | E | 11 | 1,170 | 1,170 | 38.7 | 90.5 | 42.8 |
| 8 | F | 6 | 1,151 | 1,153 | 32.3 | 94.4 | 34.2 |
| 9 | F | 10 | 1,163 | 1,164 | 33.4 | 88.5 | 37.8 |
| 10 | F | 15 | 1,163 | 1,164 | 31.7 | 89.0 | 35.7 |
| 11 | F | 16 | 1,163 | 1,162 | 32.1 | 92.1 | 34.9 |

[a] Average of temperature readings taken at 15 minute intervals.

The data in Table VII show that catalysts E and F of this invention give much higher selectivities at higher conversions than that of catalyst D which contains no iron oxide and is outside the scope of this invention. At equal conversions the difference in selectivity would be even greater since higher conversions result in lower selectivity with a given catalyst; this is brought out, for instance by comparing run 10 with run 11. Also, note the lowering of selectivity of catalyst D when its conversion is raised to 35.2, as in run 4.

*Example VII*

In this example, comparative dehydrogenation runs were carried out using the three catalyst compositions set forth in Table VIII.

TABLE VIII

| Catalyst | Weight Percent | | |
|---|---|---|---|
| | $Cr_2O_3$ | $K_2CO_3$ | $Fe_2O_3$ |
| G | 25.0 | 70.0 | 5.0 |
| H | 60.0 | 35.0 | 5.0 |
| I | 70.0 | 25.0 | 5.0 |

These catalysts were prepared like those of Example VI and were employed in the dehydrogenation of 2-methyl-5-ethylpyridine under the same conditions. Results are shown in Table IX.

TABLE IX

| Run No. | Catalyst | Catalyst Age, Days | Catalyst(a) Temp., °F. | | MVP Yield Mol Percent | | MEP Conversion, Percent |
|---|---|---|---|---|---|---|---|
| | | | Top | Bottom | Per Pass | Selectivity | |
| 1 | G | 5 | 1,174 | 1,175 | 33.6 | 90.0 | 37.4 |
| 2 | G | 12 | 1,172 | 1,174 | 34.7 | 86.1 | 40.3 |
| 3 | G | 16 | 1,172 | 1,173 | 33.4 | 87.0 | 38.4 |
| 4 | G | 21 | 1,161 | 1,162 | 29.7 | 88.6 | 33.5 |
| 5 | H | 5 | 1,129 | 1,130 | 28.9 | 83.8 | 34.5 |
| 6 | H | 6 | 1,137 | 1,138 | 32.1 | 83.3 | 38.5 |
| 7 | H | 12 | 1,154 | 1,154 | 33.9 | 81.9 | 41.5 |
| 8 | H | 13 | 1,165 | 1,164 | 37.1 | 82.8 | 44.8 |
| 9 | I | 5 | 1,133 | 1,132 | 24.6 | 76.3 | 32.3 |
| 10 | I | 11 | 1,146 | 1,149 | 27.3 | 74.7 | 36.6 |
| 11 | I | 14 | 1,145 | 1,149 | 26.4 | 75.5 | 35.0 |
| 12 | I | 15 | 1,146 | 1,147 | 25.6 | 75.6 | 33.9 | a See footnote at bottom of Table VII.

The data in Table IX show that catalysts G and H of this invention also give much higher selectivities at higher conversions than that of catalyst I which contains a higher percentage of $Cr_2O_3$ than that within the scope of this invention.

*Example VIII*

In this example, comparative dehydrogenation runs were carried out using the three catalyst compositions of this invention set forth in Table X.

TABLE X

| Catalyst | Weight Percent | | |
|---|---|---|---|
| | $Cr_2O_3$ | $K_2CO_3$ | $Fe_2O_3$ |
| J | 55.0 | 40.0 | 5.0 |
| K | 33.0 | 52.0 | 15.0 |
| L | 23.0 | 52.0 | 25.0 |

The catalysts were prepared by the usual procedure of hammer milling the components together, slugging, grinding and sieving the mixture to 35–100 mesh, drying the powder at 470° F. for about 7 hours and forming it into ⅛-inch tablets. The catalysts were employed in the dehydrogenation of 2-methyl-5-ethylpyridine under the same conditions as that of Example VII. Results are shown in Table X.

TABLE X

| Run No. | Catalyst | Catalyst Age, Days | Catalyst a Temp., °F. | | MVP Yield, Mol Percent | | MEP Conversion, Percent |
|---|---|---|---|---|---|---|---|
| | | | Top | Bottom | Per Pass | Selectivity | |
| 1 | J | 3 | 1,130 | 1,125 | 40.6 | 83.2 | 48.8 |
| 2 | J | 4 | 1,129 | 1,127 | 31.2 | 85.9 | 36.4 |
| 3 | J | 5 | 1,127 | 1,126 | 32.1 | 87.7 | 36.6 |
| 4 | J | 7 | 1,127 | 1,125 | 30.8 | 86.0 | 35.8 |
| 5 | J | 10 | 1,129 | 1,128 | 31.2 | 87.1 | 35.9 |
| 6 | J | 11 | 1,125 | 1,122 | 29.2 | 86.0 | 34.0 |
| 7 | J | 12 | 1,145 | 1,143 | 32.9 | 84.4 | 39.0 |
| 8 | J | 13 | 1,155 | 1,154 | 35.3 | 86.0 | 41.0 |
| 9 | K | 2 | 1,096 | 1,091 | 31.4 | 86.0 | 36.5 |
| 10 | K | 5 | 1,099 | 1,095 | 28.4 | 88.8 | 32.0 |
| 11 | K | 8 | 1,120 | 1,115 | 26.4 | 89.2 | 29.6 |
| 12 | K | 9 | 1,124 | 1,123 | 30.7 | 88.0 | 34.9 |
| 13 | K | 14 | 1,129 | 1,125 | 29.2 | 89.3 | 32.8 |
| 14 | L | 1 | 1,099 | 1,099 | 34.3 | 87.2 | 39.4 |
| 15 | L | 5 | 1,125 | 1,124 | 31.7 | 86.5 | 36.7 |
| 16 | L | 6 | 1,123 | 1,122 | 29.5 | 87.0 | 33.9 |
| 17 | L | 7 | 1,123 | 1,123 | 29.1 | 88.3 | 33.0 |
| 18 | L | 13 | 1,124 | 1,125 | 28.1 | 86.7 | 32.4 |
| 19 | L | 16 | 1,126 | 1,126 | 28.6 | 87.0 | 32.9 | a See footnote at bottom of Table VII.

The data in Table X show that catalysts K and L which have respectively greater percentages of $Fe_2O_3$ and respectively lower percentages of $Cr_2O_3$ than that of catalyst J, also give high selectivities at high conversions.

As will be evident to those skilled in the art, various modifications of this invention can be made or followed in the light of the foregoing disclosure and discussion without departing from the spirit or scope of the disclosure or from the scope of the claims.

We claim:

1. A method of dehydrogenating an alkylpyridine which comprises charging to a dehydrogenation zone vapors of said alkylpyridine mixed with steam and a catalyst comprising a mixture of chromium oxide, iron oxide and a potassium compound, of which mixture 40 to 45 weight percent is chromium oxide, 3 to 7 weight percent is iron oxide and 50 to 55 weight percent is at least one potassium compound (calculated as $K_2CO_3$) selected from the group consisting of KOH, $K_2O$ and $K_2CO_3$, and passing said vapors in said zone into contact with said catalyst at a temperature within the range of 1000 to 1400° F.

2. In the dehydrogenation of 2-methyl-5-ethylpyridine, the steps which comprise charging to a dehydrogenation zone a mixture of vapors of said 2-methyl-5-ethylpyridine with steam, and a catalyst comprising a mixture of chromium oxide, iron oxide and a potassium compound, of which mixture 40 to 45 weight percent is chromium oxide, 3 to 7 weight percent is iron oxide and 50 to 55 weight percent is at least one potassium compound (calculated as $K_2CO_3$) selected from the group consisting of KOH, $K_2O$ and $K_2CO_3$, and passing said vapors in said zone into contact with said catalyst at a temperature within the range of 1100 to 1400° F.

3. A method of dehydrogenating an alkylpyridine which comprises charging to a dehydrogenation zone vapors of said alkylpyridine mixed with steam and a catalyst comprising a mixture of chromium oxide, iron oxide and a potassium compound, of which mixture 40 to 45 weight percent is chromium oxide, 3 to 7 weight percent is iron oxide and 50 to 55 weight percent is at least one potassium compound (calculated as $K_2CO_3$) selected from the group consisting of KOH, $K_2O$ and $K_2CO_3$, and passing said vapors in said zone into contact with said catalyst, said contacting being effected at a temperature in the range from 1000 to 1400° F. and employing a liquid hourly space velocity expressed as liquid volumes of alkylpyridine charged per volume of catalyst per hour in the range from 0.5 to 5, the steam being present in the amount of 2 to 15 parts by weight per part of alkylpyridine charged.

4. In the dehydrogenation of an alkylpyridine, the steps which comprise contacting a mixture of said alkylpyridine and steam with a catalyst consisting essentially of 3 to 7 weight percent iron oxide, 40 to 45 weight percent chromium oxide and 50 to 55 weight percent of at least one potassium compound (calculated as $K_2CO_3$) selected from the group consisting of KOH, $K_2O$ and $K_2CO_3$, at a temperature in the range of 1100 to 1400° F.

5. A method of dehydrogenating 2-methyl-5-ethylpyridine which comprises passing the vapors of said 2-methyl-5-ethylpyridine together with 2 to 15 parts by weight of steam per part of said 2-methyl-5-ethylpyridine into contact with a catalyst consisting essentially of 3 to 7 weight percent iron oxide, 40 to 45 weight percent chromium oxide and 50 to 55 weight percent potassium carbonate, at a temperature within the range of 1100 to 1300° F.

References Cited in the file of this patent

UNITED STATES PATENTS

| | | |
|---|---|---|
| 2,408,140 | Gutzeit | Sept. 24, 1946 |
| 2,509,869 | Kirshenbaum | May 30, 1950 |
| 2,603,610 | Amos et al. | July 15, 1952 |
| 2,732,376 | Wagner | Jan. 24, 1956 |
| 2,769,811 | Mahan | Nov. 6, 1956 |
| 2,851,504 | Hogan et al. | Sept. 9, 1958 |
| 2,866,790 | Pitzer | Dec. 30, 1958 |
| 2,866,791 | Pitzer | Dec. 30, 1958 |

OTHER REFERENCES

Daniels et al.: "Physical Chemistry," 2nd edition (1961), page 315.